US012726909B2

(12) United States Patent
Awarkeh et al.

(10) Patent No.: US 12,726,909 B2
(45) Date of Patent: Sep. 1, 2026

(54) METHOD FOR CONFIGURING AN EMITTER DEVICE AND EMITTER DEVICE FOR IMPLEMENTING SAID CONFIGURATION METHOD

(71) Applicant: Orange, Issy-les-Moulineaux (FR)

(72) Inventors: Nour Awarkeh, Chatillon Cedex (FR); Dinh Thuy Phan Huy, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 302 days.

(21) Appl. No.: 18/700,994

(22) PCT Filed: Oct. 11, 2022

(86) PCT No.: PCT/EP2022/078313

§ 371 (c)(1),
(2) Date: Apr. 12, 2024

(87) PCT Pub. No.: WO2023/062042

PCT Pub. Date: Apr. 20, 2023

(65) Prior Publication Data

US 2024/0414656 A1 Dec. 12, 2024

(30) Foreign Application Priority Data

Oct. 14, 2021 (FR) ....................................... 2110907

(51) Int. Cl.
*H04W 52/06* (2009.01)
*H04W 52/36* (2009.01)

(52) U.S. Cl.
CPC ......... *H04W 52/06* (2013.01); *H04W 52/367* (2013.01)

(58) Field of Classification Search
CPC ... H04W 52/06; H04W 52/367; H04W 52/42; H04W 52/143; H04B 17/102;
(Continued)

(56) References Cited

U.S. PATENT DOCUMENTS 5,103,310 A * 4/1992 Gibson .................. H04N 9/646
348/433.1
8,526,538 B2 * 9/2013 Lee ...................... H04B 7/0691
375/299

(Continued)

OTHER PUBLICATIONS

International Search Report and Written Opinion dated Jan. 24, 2023 for Application No. PCT/EP2022/078313.

(Continued)

*Primary Examiner* — Dominic E Rego
(74) *Attorney, Agent, or Firm* — Knobbe, Martens, Olson & Bear, LLP

(57) ABSTRACT

A method for configuring a transmitter device (TX) equipped with a plurality of antenna elements is described, the method making it possible both to adjust the electric field of beam F_1 so that the regulatory constraint is observed and to improve the rate received by a receiver device in the case of the signal following path P_2, by ensuring that the electric field of beam F_2 is equal to that of beam F_1, while still observing the regulatory constraint. In other words, the electric field of beams F_1 and F_2 is identical and maximized while still observing the regulatory constraint. As a result, the operation criterion is improved.

12 Claims, 6 Drawing Sheets

(58) Field of Classification Search
CPC .. H04B 7/0634; H04B 17/391; H04B 7/0617; H04L 25/021; H04L 25/03343
See application file for complete search history.

(56) References Cited

U.S. PATENT DOCUMENTS

| | | | | |
|---|---|---|---|---|
| 9,853,702 | B1 * | 12/2017 | Liang | H04B 7/0456 |
| 2005/0157683 | A1 * | 7/2005 | Ylitalo | H04B 7/0669 370/334 |
| 2012/0082192 | A1 * | 4/2012 | Pelletier | H04B 7/0404 375/219 |
| 2013/0077708 | A1 * | 3/2013 | Sorrells | H04B 1/04 375/295 |
| 2013/0301454 | A1 * | 11/2013 | Seol | H04B 7/0456 370/252 |
| 2014/0086217 | A1 * | 3/2014 | Park | H04B 7/06952 370/335 |
| 2014/0307704 | A1 | 10/2014 | Arogyaswami | |
| 2017/0310376 | A1 * | 10/2017 | Järmyr | H04B 7/043 |
| 2020/0045653 | A1 * | 2/2020 | Hunukumbure | H04W 52/241 |
| 2020/0322192 | A1 * | 10/2020 | Yamaguchi | H04L 25/067 |
| 2021/0092687 | A1 * | 3/2021 | Harrison | H04L 25/0226 |

OTHER PUBLICATIONS

Aw Arkeh Nour et al. “Electro-Magnetic Field (EMF) aware beamforming assisted by Reconfigurable Intelligent Surfaces” 2021 IEEE 22nd International Workshop on Signal Processing Advances in Wireless Communications (SPA WC), IEEE, Sep. 27, 2021 (Sep. 27, 2021), pp. 541-545.

* cited by examiner

[Fig.1]
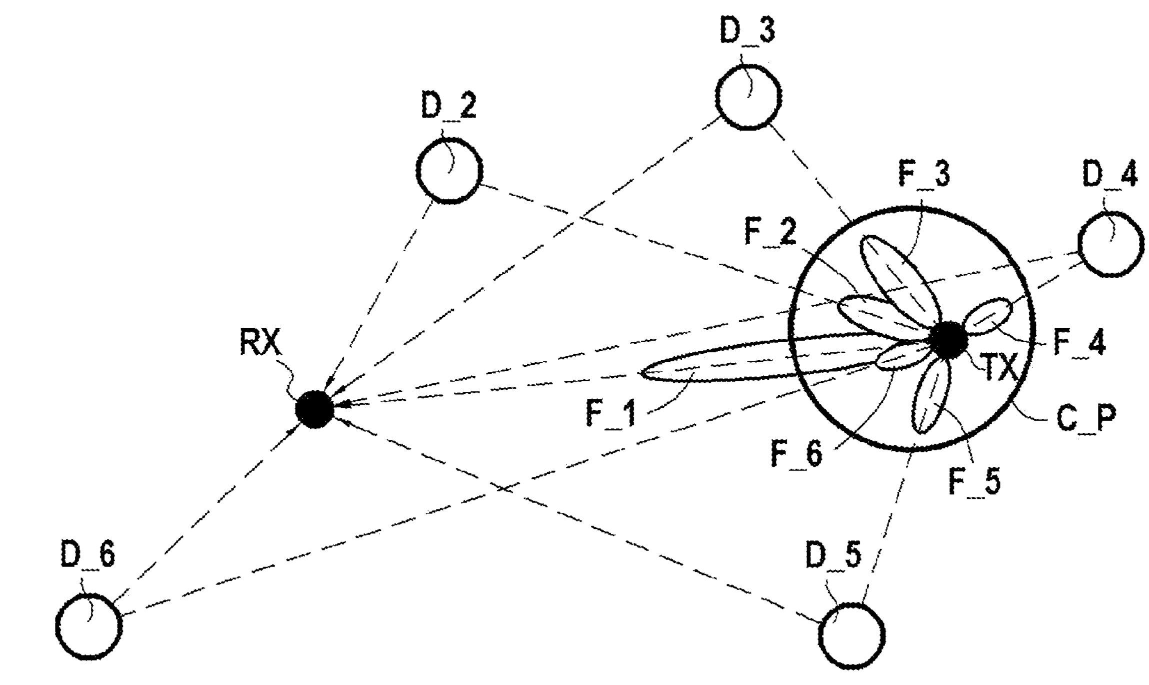
[Fig.2]
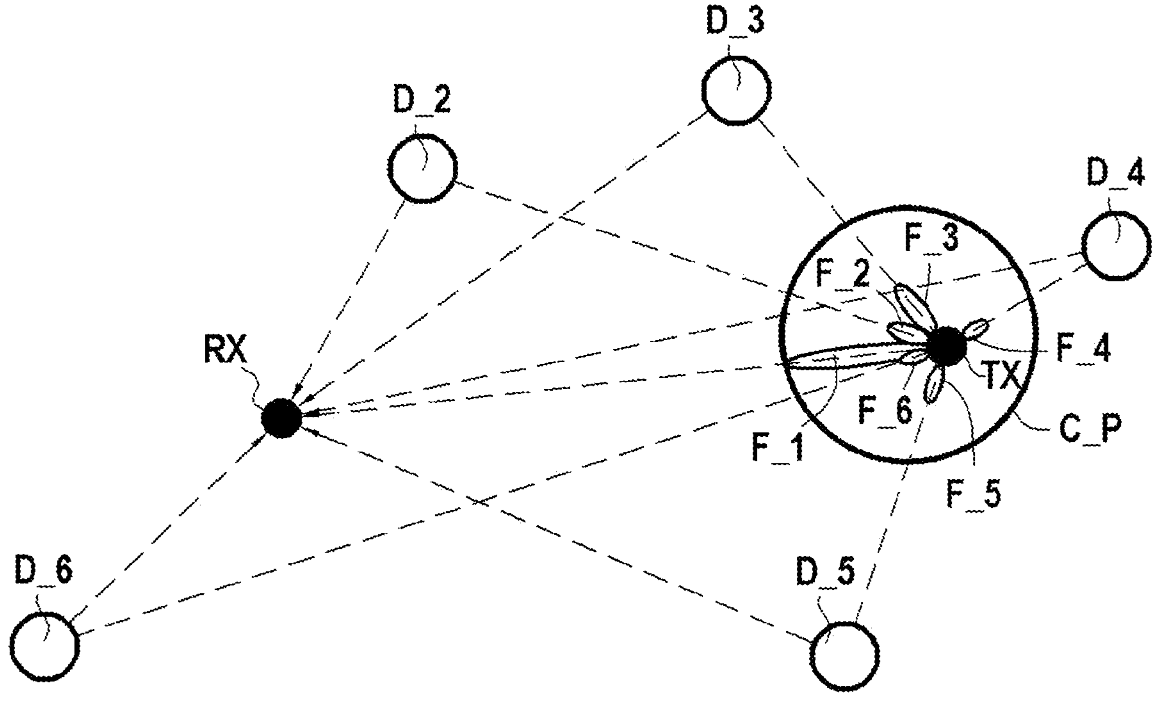

[Fig.3A]
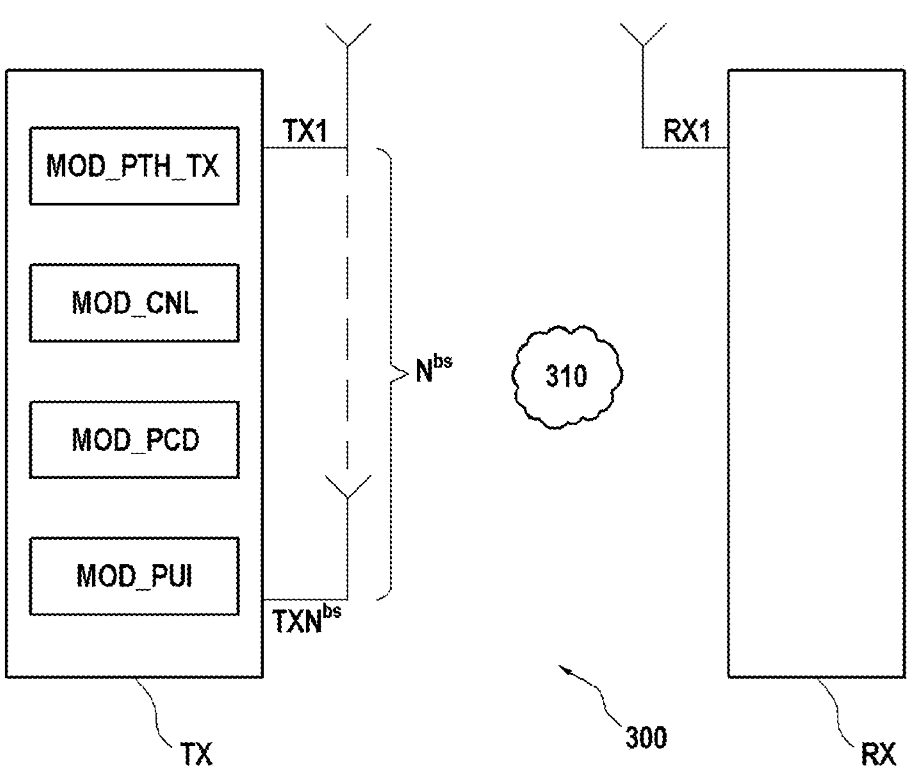
[Fig.3B]
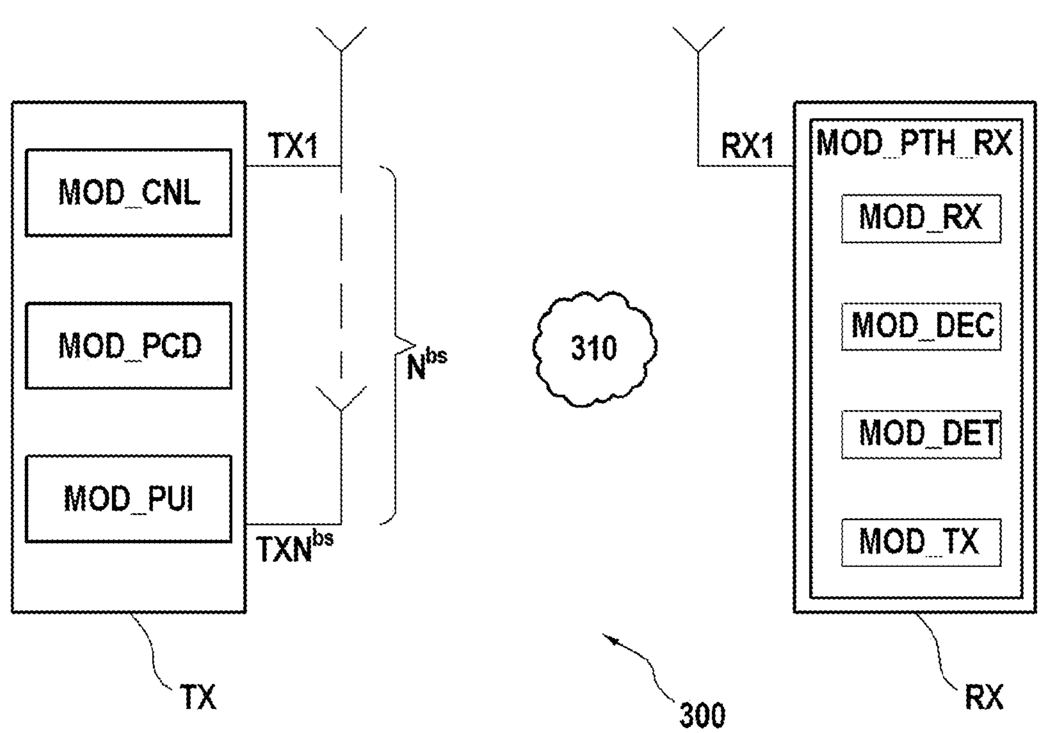

[Fig.4A]
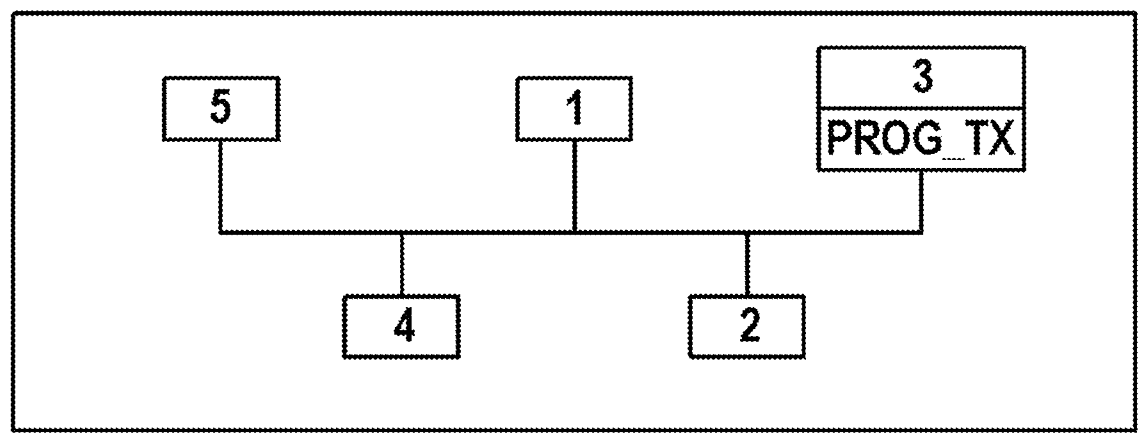
[Fig.4B]
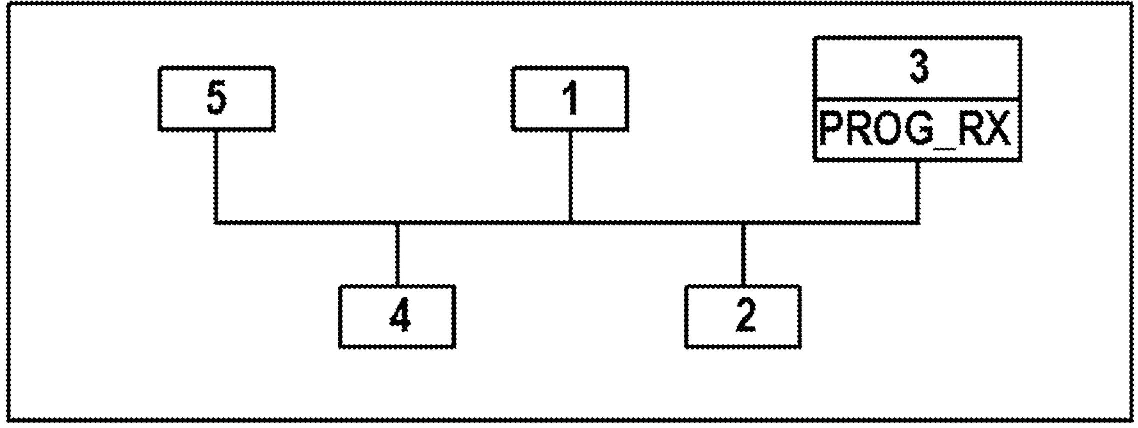

[Fig.5A]
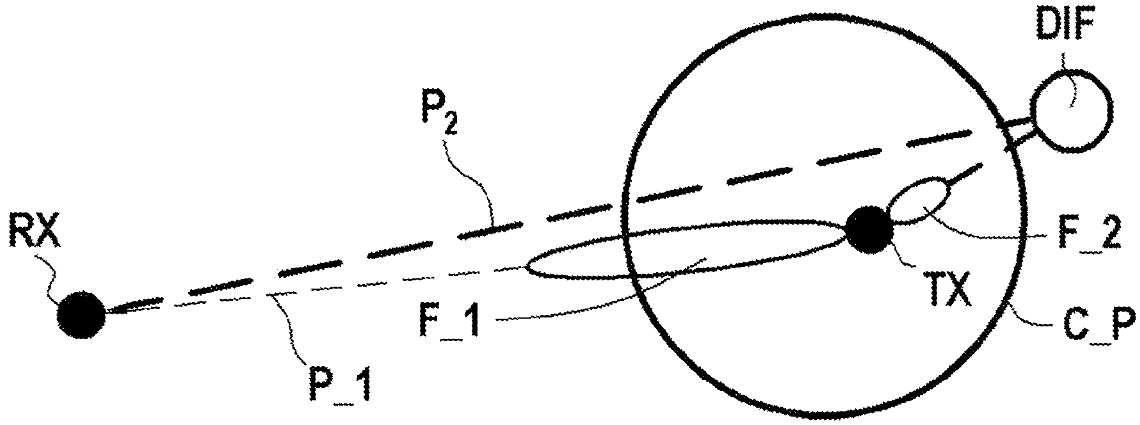
[Fig.5B]
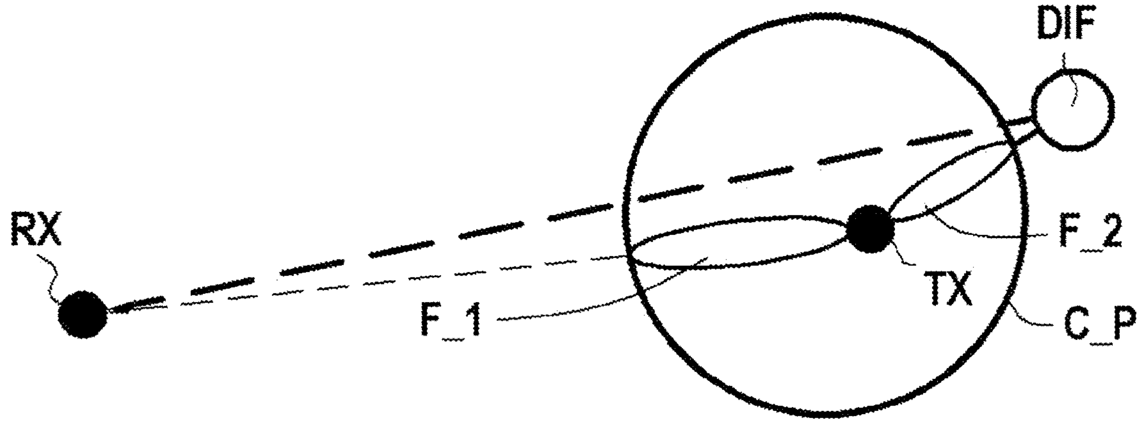

[Fig.6]
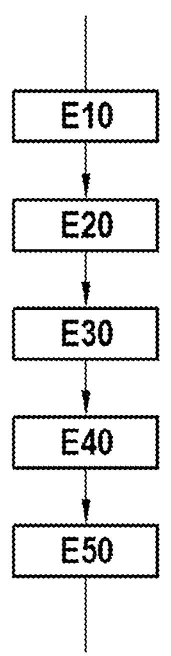
[Fig.7]
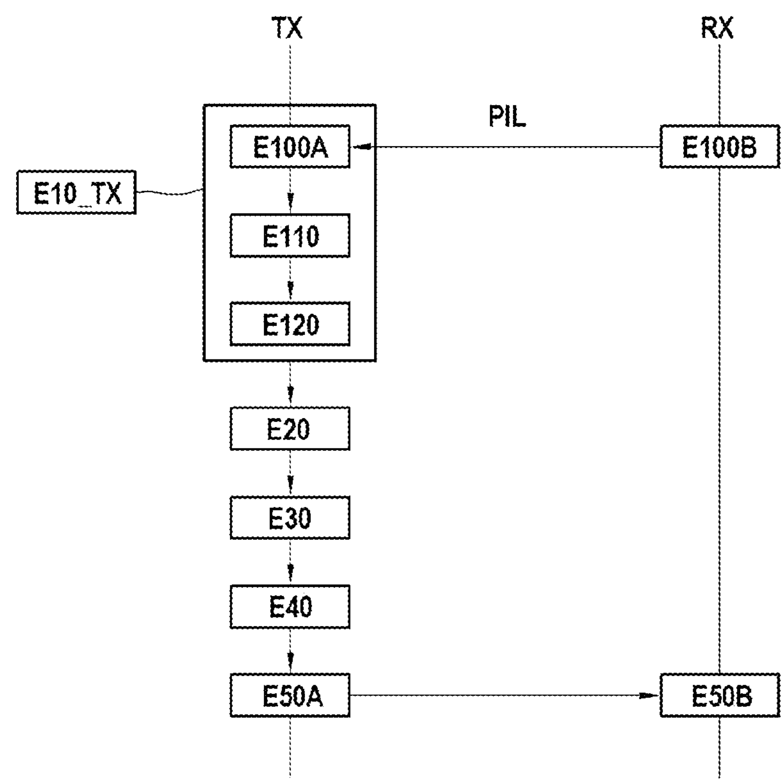

[Fig.8]
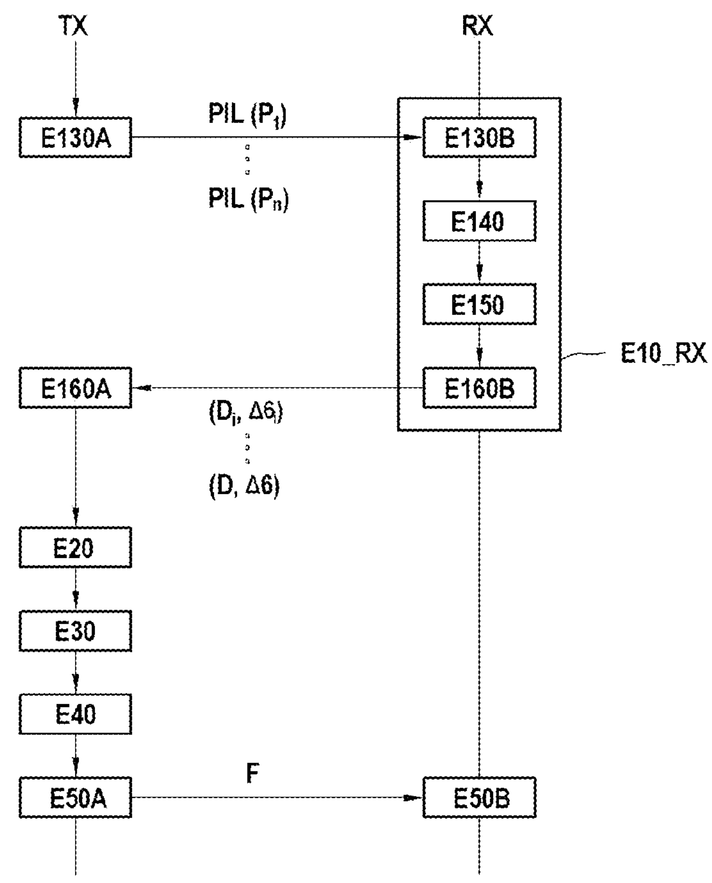
[Fig.9]
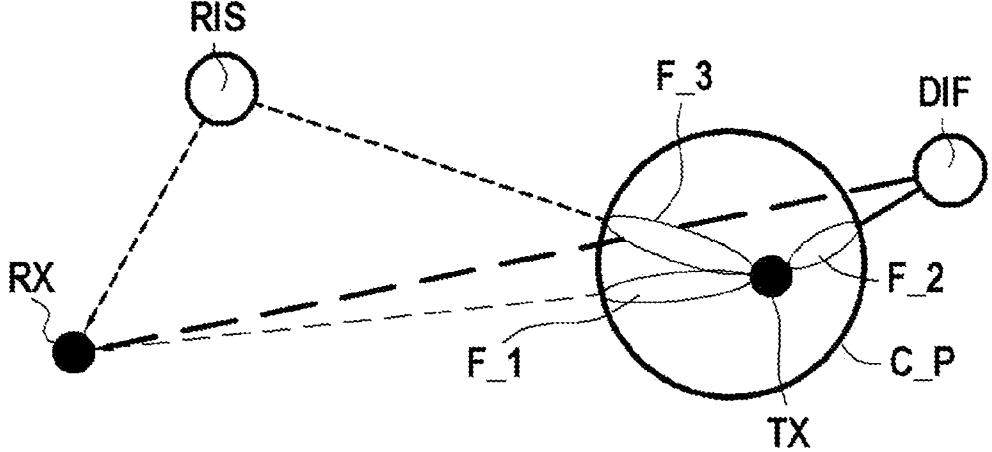

METHOD FOR CONFIGURING AN EMITTER DEVICE AND EMITTER DEVICE FOR IMPLEMENTING SAID CONFIGURATION METHOD

RELATED APPLICATIONS

This application is the U.S. National Phase of Application No. PCT/EP2022/078313 entitled "METHOD FOR CONFIGURING A TRANSMITTER DEVICE, AND TRANSMITTER DEVICE FOR IMPLEMENTING SAID CONFIGURATION METHOD" and filed Oct. 11, 2022, which claims the benefit of French Patent Application No. 2110907, filed Oct. 14, 2021, each of which is incorporated by reference in its entirety.

FIELD OF THE DISCLOSURE

The present invention belongs to the general field of telecommunications, and in particular to the field of wireless communications implemented on radio type networks such as mobile networks (e.g., 5G).

It more particularly relates to a method for configuring an emitter device. It also relates to an emitter device of a communication system; and a communication system comprising an emitter device according to the invention and a receiver device.

The invention finds a particularly advantageous application, although without limitation, in the case of a communication system comprising an emitter device equipped with a plurality of antenna elements and a receiver device each equipped with a single antenna element, also called MISO (Multiple Input Single Output) communication system.

BACKGROUND OF THE DISCLOSURE

For an emitter device belonging to a wireless communication system and including a plurality of emission antenna elements, it is known to use a precoder making it possible to simultaneously transmit, to a receiver device belonging to the same system, one or several signals via the different emission antenna elements of the emitter device. Such a precoder is based on the knowledge by the emitter device of the propagation channel (or the transmission channel) which separates it from the receiver device. It allows the emitter device to deliver data to the receiver device with high spectral efficiency thanks to beamforming transporting the signals.

Such a precoder is designed so that the emission of signals in the form of beams is optimized with regard to a determined operating criterion, such as for example a quality of service criterion of the data transmission (maximization of the rate or power received at the receiver device, absence of interference between time symbols at the receiver device, etc.), or a criterion of spectral efficiency of the network taking into account interference generated on other users, or a criterion of energy efficiency of the network, etc. Known examples of precoders are for example those of the zero forcing (or ZF) type, those of the maximum ratio transmission (or MRT) type, those carrying out eigenbeamforming, those carrying out beamforming by singular value decomposition (or SVD), etc.

Moreover, the current design of an emitter, although aimed at optimizing a determined criterion, is carried out independently of any regulations relating to the limitation of the exposure of individuals (public or workers) to electromagnetic fields, and capable of being applied where the emitter device is intended to operate.

Such regulations set field (electric, magnetic field) levels that must not be exceeded as a function of the emission frequency of the emitter device. These field levels constitute exposure limits which can be formulated equivalently in terms of power radiated in a certain direction by the emitter device and received by a person. This radiated power is called Equivalent Isotropic Radiated Power (EIRP).

For example in France, and with regard to workers, such regulations are included in the Labor Code in articles R. 4453-1 to R. 4453-34. As for the public, the regulations concerned are provided by Decree No. 2002-775 following the transposition of the European Recommendation 1999/519/CE.

The regulations also set an exposure limit associated with a regulatory distance from the emitter device, typically imposed by geographical implementation constraints of the emitter device and defined by an entity in charge of managing the communication system (for example a telephone operator). In this way, it is possible to define a regulatory area around the emitter device beyond which an exposure limit must not be exceeded.

It should also be noted that the entity in charge of managing the communication system can define stricter rules, and thus define a restricted regulatory area comprised within the regulatory area.

However, it may happen that an exposure limit is not respected following one or several beam directions beyond the regulatory area associated with the emitter device.

FIG. 1 schematically represents, in accordance with the state of the art, a mode of emission of signals between an emitter device TX and a receiver device RX of a wireless communication system.

Diffusing elements D_i, for i varying from 2 to 6, of a type known per se, exist in the environment of the emitter TX and receiver RX devices. These diffusing elements D_i correspond for example to walls or trees on which an electromagnetic wave "bounces". For each of these diffusers D_i, there is a propagation path between the emitter TX and receiver RX devices and passing through the considered diffuser. The relative positions of the emitter TX and receiver RX devices, as well as diffusers D_i, can be identified by geographic coordinates, for example in a Cartesian coordinate system.

FIG. 1 also illustrates the radiation of the emitter device TX. More particularly, FIG. 1 schematically illustrates the formation of six beams F_i, for i varying from 1 to 6, generated by the emitter device TX by means of a precoder. FIG. 1 also illustrates whether or not these six beams F_i meet the regulations through a circle C_P surrounding the emitter device TX. As explained in more detail later, this circle C_P is here representative of the regulatory area beyond which the electric field must remain below a maximum permissible exposure limit.

More specifically, the circle C_P corresponds to a distance beyond which a maximum electric field must not be exceeded, as a function of an angular direction considered in relation to the emitter device TX. Furthermore, it is important to note that said circle C_P is not an effective representation of said regulatory area, the latter also being able to take any form, but is nevertheless linked to it via in particular said exposure limit (in other words, the regulatory area is not represented in FIG. 1).

Moreover, as represented in FIG. 1, each beam has a substantially oblong shape and points in a particular direction. This characteristic results from the use, by the emitter device TX, of a precoder allowing the emitter device to emit beams in determined directions, such as a maximum ratio transmission, MRT, type precoder.

Therefore, and as can be seen in FIG. 1, the use of such a precoder by the emitter implies that the regulatory constraint is not met along the direction of the beam F_1. Indeed, a portion of the beam F_1 extends outside the circle C_P, which means that the maximum electric field associated with the regulatory constraint is exceeded outside the regulatory area.

In order to circumvent this problem, it was proposed to decrease the electrical power applied to the emitter device TX while retaining a precoder MRT, so that the effective transmitting power of the latter is lower than the maximum transmitting power for which it was designed.

The fact of thus decreasing the transmitting power makes it possible to bring the operation of the emitter device compliant with the exposure limitations imposed in the associated regulatory area. However, such a way of proceeding cannot be considered satisfactory insofar as it reduces the electric field emitted in all the directions of the beams. This results in a significant degradation of the operating conditions of the communication system (decrease in the rate or power received at the receiver device, etc.).

This disadvantageous situation is illustrated, by way of non-limiting example, in FIG. 2 which corresponds to FIG. 1 after a power decrease in accordance with the state of the art has been applied to the emitter device TX.

As illustrated in FIG. 2, the beam F_1 is now contained in the circle C_P, so that the regulatory constraint is now met by the emitter device TX. It can nevertheless be noted that the respective sizes of the other beams F_2 to F_6 have significantly decreased so that these are now very far from the maximum electric field associated with the circle C_P. These decreases significantly degrade the transmission of data from the emitter device TX to the receiver device RX.

SUMMARY

The present invention aims to overcome all or part of the drawbacks of the prior art, in particular those set out above, by proposing a solution that makes it possible to monitor the electric field of the emitter device in a more optimal manner than the solutions of the prior art.

For this purpose, and according to a first aspect, the invention relates to a method for configuring an emitter device equipped with a plurality of antenna elements, the method comprising:

- a step of determining, by the emitter device or a receiver device, a plurality of paths called "real paths" of a propagation channel called "real propagation channel" between the emitter device and the receiver device, each of the real paths being associated with an amplitude gain, a phase shift and a direction starting from said emitter device (TX);
- a step of determining, by the emitter device, a virtual propagation channel comprising a plurality of virtual paths, a virtual path corresponding to one of the real paths, each virtual path having the same starting direction and the same phase shift as the real path to which it corresponds, and the virtual paths having an amplitude gain comprised in a same determined real and positive interval;
- a step of determining, by the emitter device and as a function of said virtual propagation channel, a precoder configured to precode a signal intended to be emitted in the form of beams pointing in the directions of the virtual paths, so that said beams all reach, in their direction, an electric field comprised in a same determined interval; and,
- a step of determining an transmitting power, so that the electric field of said beams is smaller than a threshold value beyond a defined area around the emitter device.

Generally, it is considered that the steps of a method should not be interpreted as being linked to a notion of temporal succession.

In particular modes of implementation, the configuration method can further include one or several of the following characteristics, taken separately or in all technically possible combinations.

In particular modes of implementation, the precoder is represented in the form of a column vector with complex coefficients whose number of elements is equal to the number of antenna elements of the emitter device.

In particular modes of implementation, at least one of said real paths passes through a diffuser, and the starting direction of this real path corresponds to the direction of a portion of the real path located between said emitter device and the diffuser.

In particular modes of implementation, the real propagation channel is in downlink, the step of determining the real paths is implemented by the emitter device, and this step comprises:

- a sub-step of receiving a pilot sequence emitted by the receiver device and received from an uplink propagation channel;
- a sub-step of decomposing, as a function of the received pilot sequence, said uplink propagation channel into a plurality of uplink paths;
- and the real paths are determined by taking into account a principle of reciprocity of the uplink and downlink propagation channels.

In particular modes of implementation, the step of determining the real paths is implemented by the receiver device, and this step comprises:

- a sub-step of receiving, by the receiver device, a plurality of pilot sequences coming from the emitter device, each pilot sequence being precoded by using a precoder associated with a direction in which the signal data stream is emitted by the emitter device;
- a sub-step of decomposing, by the receiver device and as a function of the plurality of received pilot sequences, the real propagation channel into the plurality of real paths;
- a sub-step of determining, by the receiver device and for each real path of the plurality, a phase shift;
- a sub-step of transmitting, by the receiver device and to the emitter device, the phase shift of each of the real paths.

In particular modes of implementation, the emitter device and the receiver device form a system that further comprises at least one reconfigurable intelligent device making it possible to generate an additional path between the emitter device and the receiver device and passing through said reconfigurable intelligent device. The method then further comprises a step of determining said additional path; and the virtual propagation channel comprises a virtual path corresponding to said additional path and whose amplitude gain is comprised in the determined interval.

In particular modes of implementation, the virtual propagation channel determined during the step of determining said channel is represented by a row vector of complex coefficients $h^{eq}$ each coefficient of which $$h^{eq}_{n^{bs}}$$

is associated with one of the antenna elements of the emitter device, and the vector is of the form:

$$h^{eq}_{n^{bs}} = \sum_{n^s=1}^{N^s} v^{eq}(n^{bs}, n^s)$$

with $v^{eq}(n^{bs}, n^s)$ the complex gain associated with the propagation path between a position $a(n^{bs})$ of the antenna element $n^{bs}$ and a position $M^T$ of the receiver device and passing through a diffuser $n^s$ at a position $\sigma(n^s)$ equalized to a value $v^{target}$ comprised in a determined interval of real and positive values $[v^{min}, v^{max}]$, $v^{eq}(n^{bs}, n^s)$ being of the form:

$$v^{eq}(n^{bs}, n^s) = v^{target} * v(n^{bs}, n^s) / \|v(n^{bs}, n^s)\|$$

and with $v(n^{bs}, n^s)$ the complex gain associated with the propagation path between the position $a(n^{bs})$ of the antenna element $n^{bs}$ and the position $M^T$ of the receiver device and passing through the diffuser $n^s$ at the position $\sigma(n^s)$, $v(n^{bs}, n^s)$ being of the form:

$$v(n^{bs}, n^s) = \beta(n^s) e^{-J\frac{2\pi}{\lambda}\delta(n^{bs}, n^s)},$$

$$\text{with } \delta(n^{bs}, n^s) = \frac{\overrightarrow{a0\sigma(n^s)}}{\|a0\sigma(n^s)\|} \cdot \overrightarrow{a0a(n^{bs})},$$

$\|A\|$ the norm of the vector A, and $\beta(n^s)$ the amplitude gain of the path $n^s$ from a position a0 corresponding to the center of the emitter device to the position $M^T$ and passing through the position $\sigma(n^s)$.

In particular modes of implementation, the precoder determined during the step of determining a precoder is of the maximum ratio transmission, MRT, type and is of the form:

$$b^{MRT,eq} = \frac{h^{eq\dagger}}{\|h^{eq\dagger}\|}$$

with $h^{eq\dagger}$ the Hermitian vector of the vector $h^{eq}$.

In particular modes of implementation, all the steps of the configuration method are implemented by the emitter device.

In particular modes of implementation, the step of determining the plurality of real paths is implemented by the receiver device, and the other steps are implemented by the emitter device.

According to a second aspect, the invention relates to a transmission method comprising all the steps of the configuration method, and further comprising a step of transmitting the signal by the emitter device.

According to a third aspect, the invention relates to a computer program including instructions for the implementation of a configuration method according to the invention when said program is executed by a computer.

This program can use any programming language, and be in the form of source code, object code, or intermediate code between source code and object code, such as in a partially compiled form, or in any other desirable form.

According to a fourth aspect, the invention relates to an information or recording medium readable by a computer, on which a computer program according to the invention is recorded.

The information or recording medium can be any entity or device capable of storing the program. For example, the medium can include a storage means, such as a Flash type memory, for example a USB key or an SSD (Solid State Drive) disk, such as a ROM, for example a CD ROM or a Microelectronic circuit ROM, or a magnetic recording means, such as a hard disk, for example a HDD (Hard Disk Drive) disk.

On the other hand, the information or recording medium can be a transmissible medium such as an electrical or optical signal, which can be conveyed via an electrical or optical cable, by radio or by other means. The program according to the invention can be particularly downloaded from an Internet type network.

Alternatively, the information or recording medium can be an integrated circuit in which the program is incorporated, the circuit being adapted to execute or to be used in the execution of the method in question.

According to a fifth aspect, the invention relates to an emitter device equipped with a plurality of antenna elements and comprising:

- a module for determining a virtual propagation channel comprising a plurality of virtual paths, a virtual path corresponding to a real path of a propagation channel called "real propagation channel", each virtual path having the same starting direction and the same phase shift as the real path to which it corresponds, and the virtual paths having an amplitude gain comprised in a same determined real and positive interval;
- a module for determining, as a function of said virtual propagation channel, a precoder configured to precode a signal intended to be emitted in the form of beams pointing in the directions of the virtual paths, so that said beams all reach, in their direction, an electric field comprised in a same determined interval; and,
- a module for determining a transmitting power, so that the electric field of said beams is smaller than a threshold value beyond a defined area around the emitter device.

According to a sixth aspect, the invention relates to a communication system including an emitter device according to the invention and a receiver device configured to receive the signal emitted by the emitter device.

In particular modes of implementation, the communication system according to the invention further comprises at least one reconfigurable intelligent device equipped with a plurality of antenna elements and making it possible to generate at least one additional path between said emitter device and said receiver device and passing through said reconfigurable intelligent device.

BRIEF DESCRIPTION OF THE DRAWINGS

Other characteristics and advantages of the present invention will emerge from the description given below, with reference to the appended drawings which illustrate one exemplary embodiment devoid of any limitation. In the figures:

FIG. 1 schematically represents, in a horizontal sectional view and in accordance with the state of the art, a mode of emission signals between an emitter device and a receiver device;

FIG. 2 corresponds to FIG. 1 after a power decrease in accordance with the state of the art has been applied to the emitter device;

FIG. 3A schematically represents one exemplary embodiment of a wireless communication system comprising an emitter device and a receiver device, according to a first embodiment of the invention;

FIG. 3B schematically represents one exemplary embodiment of a wireless communication system comprising an emitter device and a receiver device, according to a second embodiment of the invention;

FIG. 4A schematically represents one example of hardware architecture of an emitter device according to the invention belonging to the communication system of FIG. 3A or FIG. 3B;

FIG. 4B schematically represents one example of hardware architecture of a receiver device according to the invention belonging to the communication system of FIG. 3B;

FIG. 5A schematically represents the emission of a signal in the form of a beam in a wireless communication system, in accordance with the state of the art.

FIG. 5B schematically represents the effects of the application of the invention to the wireless communication system of FIG. 5A;

FIG. 6 represents, in flowchart form, a configuration method according to the invention, as implemented by the emitter and/or receiver devices of FIG. 3A;

FIG. 7 represents, in flowchart form, one particular method of the monitoring method illustrated in FIG. 6, when the determination step (E10) is implemented by the emitter device;

FIG. 8 represents, in flowchart form, one particular method of the monitoring method illustrated in FIG. 6, when the determination step (E10) is implemented by the receiver device;

FIG. 9 schematically represents the effects of the application of the invention to a wireless communication system, further comprising a reconfigurable intelligent device.

DETAILED DESCRIPTION OF ILLUSTRATIVE EMBODIMENTS

FIG. 3A and FIG. 3B schematically represent exemplary embodiments of a wireless communication system 300 according to the invention.

As illustrated in FIG. 3A and FIG. 3B, the communication system 300 comprises:

- an emitter device TX equipped with $N^{bs}$ emission antenna elements TX1, . . . , TX $N^{bs}$ positioned along an axis, $N^{bs}$ designating an integer greater than 1; and
- a receiver device RX equipped with a receiving antenna element RX1.

In this way, the communication system 300 forms a MISO (Multiple Input Single Output) system.

It should however be noted that the fact of considering a single receiving antenna element at the receiver device RX in no way constitutes a limitation of the invention. Thus, nothing excludes considering a receiver device RX equipped with a plurality of receiving antenna elements RX1, . . . , RXN, N designating an integer greater than 1.

Preferably, the antenna elements of the receiver device are spaced from each other by half a wavelength, 0.5 λ with λ the length of the wave emitted by the receiver device.

The emitter device TX and the receiver device RX are configured here to communicate with each other via a wireless telecommunications network. However, no limitation is attached to the form taken by the emitter TX and receiver RX devices. For example, whatever the device considered, it can be a base station or a user equipment. Preferably, the emitter device TX is a base station, and the receiver device RX is a terminal.

The emitter device TX and the receiver device RX are separated by a real propagation channel 310 comprising a plurality of real propagation paths between the emitter device TX and the receiver device RX, and which can be taken by a signal emitted by the emitter device TX.

It is assumed here that the communication system 300 uses, during communications between the emitter device TX and the receiver device RX, a multi-carrier waveform of the OFDM (Orthogonal Frequency Division Multiplexing) type. The use of such a waveform has the consequence that for a given (sub) carrier, the propagation channel 310 is frequency-flat (i.e. all frequencies are attenuated in a similar way by the propagation channel 310). This channel is then written in the form of a complex row vector noted h and having NBS columns.

The emitter device TX is typically configured to apply in emission, on the data it sends to the receiver device RX, a precoding based on a knowledge, at each moment, by the emitter device RX, of the propagation channel 310 which separates it from the receiver device RX.

The precoding of the emitter device TX aims at optimizing, with regard to a determined operating criterion, an emission of signals in the form of beams to the receiver device RX.

For the remainder of the description, it is considered that the precoding of the emitter device TX is of the MRT type, so as to optimize a quality of service criterion corresponding to a maximization of the rate received at the receiver device RX. The choice of such a precoder only constitutes a variant of implementation of the invention, any other precoder based on the knowledge of the emission channel and allowing the emitter device to emit beams in the starting directions of the propagation paths can be considered.

Moreover, nothing excludes considering an operating criterion which differs from a quality of service criterion, such as for example a criterion of spectral efficiency of the network taking into account interference generated on other users, or a criterion of energy efficiency of the network, or an operating criterion combining several criteria together, these criteria may or may not be of the quality of service type.

It must therefore be understood that the operating criterion is a criterion set by an entity that owns the communication system, such as for example a company wishing to propose communication services able to satisfy customers as part of an optimization of the quality of service. Consequently, said operating criterion differs from any regulatory framework that the communication system 300 may be facing due to the national legislation applicable to it.

The emitter device TX according to the invention is associated with a regulatory constraint corresponding to a threshold value relating to an electromagnetic quantity not being exceeded, outside of a predefined area around said emitter device, called "regulatory area". As mentioned previously, such a constraint results from a regulatory framework linked to the legislation in force where the communication system 300 is installed, or from a framework specific to the entity in charge of managing the communication system and which is stricter than the legislation in force.

For the remainder of the description, it is considered, without limitation, that the communication system 300 is installed in France. Therefore, this system 300 is subject to a regulatory framework aimed at defining limits of exposure of the public to the electromagnetic field emissions, as specified in Decree No. 2002-775. More particularly, it is considered here that the radio signals generated by the emitter device TX have a frequency comprised between 2 GHz and 300 GHz. Therefore, the regulations indicate in their annex 2.2 (table A) that the threshold value of the electric field E not to be exceeded, for such a frequency range, is equal to 61 V/m (volt per meter).

It should be noted that the previous example concerning France was given for purely illustrative purposes. Thus, no limitation is attached to the country that can be considered, those skilled in the art being able to access the adhoc regulatory framework.

Nothing also excludes considering other frequency ranges for the signals emitted by the emitter device TX, so as to obtain a threshold value for the electric field which is different from 61 V/m. Generally, no limitation is attached to the type of communication network used, as mentioned above, or to the frequency range considered.

Furthermore, the electromagnetic quantity considered in the remainder of the description for the regulatory constraint concerns the electric field. However, nothing excludes considering another electromagnetic quantity, such as for example the maximum EIRP, or possibly another quantity, such as for example a magnetic field intensity (expressed in amperes per meter), a magnetic induction (expressed in Tesla), etc. Generally, those skilled in the art know how to translate a threshold value associated with a given electromagnetic quantity into an equivalent threshold value associated with another electromagnetic quantity.

Finally, nothing excludes the regulatory area from being determined other than by means of a calculation formula. For example, such an area can correspond to a delimited area following an on-site measurement campaign, around an emitter device of the same type and by means of dedicated tools, such as for example a broadband isotropic probe, a spectrum analyzer, etc. According to yet another example, the regulatory area is obtained by digital simulations from a modeling of the emitter device TX, by taking into account the environment around the latter. It is also reminded that no limitation is attached to the shape of the regulatory area defined around the emitter device TX.

Within the framework of the present invention, the emitter device TX is configured to carry out processing operations aimed at monitoring the emission of a signal in the form of beams, by implementing at least the steps E20 of determining a virtual propagation channel, E30 of determining a precoder, E40 of determining an transmitting power of a configuration method according to the invention.

In one particular embodiment (illustrated in FIG. 8), the receiver device is also configured to carry out processing operations aimed at monitoring the emission, by an emitter device, of a signal in the form of beams, by implementing the step E10 of determining a plurality of paths of a configuration method according to the invention.

FIG. 4A schematically represents one example of hardware architecture of the emitter device TX belonging to the system 300 of FIG. 3A, for the implementation of said configuration method.

As illustrated in FIG. 4A, the emitter device TX has the hardware architecture of a computer. Thus, the emitter device TX includes, in particular, a processor 1, a random access memory 2, a read-only memory 3 and a non-volatile memory 4. It further includes a communication module 5.

The read-only memory 3 of the emitter device TX constitutes a recording medium in accordance with the invention, readable by the processor 1 and on which a computer program PROG_TX in accordance with the invention is recorded, including instructions for the execution of at least part of the steps of the configuration method according to the invention.

The program PROG_TX defines functional modules of the emitter device TX, and relies on or controls the hardware elements 1 to 5 of the emitter device TX mentioned above. The emitter device TX comprises:

- a module MOD_CNL for determining a virtual propagation channel comprising a plurality of virtual paths, a virtual path corresponding to one of the paths called "real paths" of a propagation channel called "real propagation channel", each virtual path having the same starting direction and the same phase shift as the real path to which it corresponds, and the virtual paths having an amplitude gain comprised in the same determined real and positive interval;
- a module MOD_PCD for determining, as a function of said virtual propagation channel, a precoder configured to precode a signal intended to be emitted in the form of beams pointing in the directions of the virtual paths, so that said beams all reach, in their direction, an electric field comprised in the same determined interval; and,
- a module MOD_PUI for determining a transmitting power, so that the electric field of said beams is smaller than a threshold value beyond a defined area around the emitter device TX.

It is recalled that by "real propagation path", it is meant a path taken by a signal between an antenna element of the emitter device TX and the receiver device RX.

By "signal", reference is here made to an electromagnetic wave propagating by non-wired means, whose frequencies are comprised in the traditional spectrum of the radio waves (a few hertz to several hundred gigahertz). By way of non-limiting example, the signal is a mobile telephone signal 5G emitted in the emission band [3.4-3.8 GHz] and/or [24.25-27.5 GHz].

Within the meaning of the invention, a virtual propagation path corresponds to a real propagation path whose amplitude gain is comprised in a determined interval of positive real numbers. This interval is for example defined as a function of an amplitude gain value called "target value" (e.g., "1"), and its amplitude depends for example on the hardware components of the emitter device TX, on quantification errors, on a calculation error and/or on a data copy. In the remainder of the description and by misuse of language, it is said that the virtual paths have the same amplitude gain when said amplitude gains are comprised in the determined interval of positive real numbers. It is also said by misuse of language that the beams have the same electric field when said electric fields are comprised in a determined interval of positive real numbers.

Equalizing the amplitude gain of the real paths of the real propagation channel makes it possible to obtain virtual propagation paths which all have the same amplitude gain value. This virtual channel is then transmitted as input to the module MOD_PCD for determining a precoder $b^{MRT,eq}$ that precodes a signal, for example by applying an MRT type precoding, so that the beams are generated in the same directions as if the precoding was applied to the real channel, but all with the same electric field value.

In the remainder of this document, the module of the electric field is called "electric field" by misuse of language.

In one particular embodiment, the emitter device TX further comprises a module MOD_PTH_TX for determining a plurality Ns of paths called "real paths" of a propagation channel called "real propagation channel" between the emitter device TX and the receiver device RX, each of the real paths being associated with an amplitude gain, a phase shift and a direction starting from said emitter device TX.

In known manner, the amplitude gain corresponds to the ability of an emitter device to increase the transmitting power of a signal. The attenuation for its part corresponds to the relative decrease in the power of a signal during its transmission, and is equal to the inverse of the amplitude gain. Also, no limitation is attached to the fact that the amplitude gain is considered within the framework of the present invention, the developments that follow being indeed adaptable without difficulty by those skilled in the art in the case of the use of attenuation values.

One objective of the invention therefore amounts to optimizing the emission of a signal in the form of beams, by configuring the emitter device TX so that it emits beams through a plurality of paths making it possible to reach the receiver device RX, by ensuring that the electric field is identical for each of said beams, and that said electric field is also lower than a threshold value $E^{THRESH}$ beyond a defined area around the emitter device TX.

Within the framework of the present invention, the communication module 5 of the emitter device TX allows it in particular to communicate with the receiver device RX, and for this purpose integrates the antenna equipping said emitter device TX. In addition to the antenna, the communication module 5 integrates hardware and software means such as those described above to implement the configuration method.

FIG. 4B schematically represents one example of hardware architecture of the receiver device RX belonging to the system 300 of FIG. 3B, for the implementation of said configuration method, according to one particular embodiment.

As illustrated in FIG. 4B, the receiver device RX has the hardware architecture of a computer. Thus, the receiver device RX includes, in particular, a processor 1, a random access memory 2, a read-only memory 3 and a non-volatile memory 4. It further includes a communication module 5.

The read-only memory 3 of the receiver device RX constitutes a recording medium in accordance with the invention, readable by the processor 1 and on which a computer program PROG_RX in accordance with the invention is recorded, including instructions for the execution of step E10 of determining a plurality of paths of the configuration method according to the invention.

The program PROG_RX defines functional modules of the receiver device RX, and relies on or controls the hardware elements 1 to 5 of the receiver device RX mentioned above. The receiver device RX comprises:

- a module MOD_RX for receiving a plurality of pilot sequences, each pilot sequence being precoded by the emitter device TX by using a precoder associated with a direction in which the signal can be emitted by this emitter device TX;
- a module MOD_DEC for decomposing, as a function of the plurality of received pilot sequences, the real propagation channel into a plurality of real paths;
- a module MOD_DET for determining, for each of the real paths, a phase shift;
- a module MOD_TX for transmitting the phase shift of each of the real paths.

In this way, the receiver device is able to make an estimation of the real propagation channel, and to determine the real paths of said channel, as well as their phase shift. For each of the real paths, the phase shift and information representing the associated precoder are transmitted to the emitter device TX. This information thus received by the emitter device TX allows it to determine a starting direction and a fortiori a virtual propagation channel.

FIG. 5A schematically represents the emission of a signal in the form of a beam in a wireless communication system, in accordance with the state of the art, and FIG. 5B schematically represents the effects of the application of the invention to the same wireless communication system.

The communication system of FIG. 5A and FIG. 5B comprises an emitter device TX and a receiver device RX. Moreover, the environment in which these two devices are located comprises a diffuser DIF. The emitter device TX emits a signal in the form of two beams F_1 and F_2, F_1 propagating via a direct path P_1 between the emitter device TX and the receiver device RX, and F_2 propagating via a path P_2 passing through the diffuser DIF.

As illustrated in FIG. 5A, the beam F_1 exits the circle C_P, which means that it does not meet the regulatory constraint. Conversely, the beam F_2 does not exit the circle C_P, which therefore implies that it meets the regulatory constraint, but the rate received by the receiver device RX in the case where the signal passes through the path P_2 is however lower than the rate received in the case where the signal passes through the path P_1.

The application of the invention is illustrated in FIG. 5B and makes it possible to both adapt the electric field of the beam F_1 so that the regulatory constraint is met, and improve the rate received by the device RX in the case where the signal follows the path P_2, ensuring that the electric field of the beam F_2 is equal to that of the beam F_1, while also meeting the regulatory constraint. In other words, the electric field of the beams F_1 and F_2 is identical and maximized while meeting the regulatory constraint. Consequently, the operating criterion is improved in the case of FIG. 5B.

For the remainder of the description, a propagation environment comprising $N^S$ diffusers and a fortiori $N^S$ corresponding paths is considered. For each path $n^s$ with $1 \le n^s \le N^s$, the signal propagates from the antenna element $n^{bs}$ to the diffuser $n^s$ before reaching the receiver RX whose position is noted $M^T$. The position of a diffuser $n^s$ is noted $\sigma(n^s) \in \mathbb{R}^{3\times 1}$, and the amplitude gain for the path $n^s$ from a position a0 corresponding to the center of the linear emitter device to the position $M^T$ and passing through the position $\sigma(n^s)$ is noted $\beta(n^s) \in \mathbb{C}$. it is assumed that $\beta(n^s)$ is a complex Gaussian random variable. It is also assumed that the diffusers are sufficiently far (for example around a hundred of wavelengths) from the emitter device TX and the receiver device RX, so that the waves emitted by the emitter device are considered to be plane waves.

The complex gain $v(n^{bs}, n^s)$ between each element $n^{bs}$ at a position $a(n^{bs})$ and $M^T$, when this path passes through a diffuser $n^s$, is expressed as follows:

$$v(n^{bs}, n^s) = \beta(n^s)e^{-j\frac{2\pi}{\lambda}\delta(n^{bs}, n^s)},$$

$$\text{with } \delta(n^{bs}, n^s) = \frac{\overrightarrow{a0\sigma(n^s)}}{\|a0\sigma(n^s)\|} \cdot \overrightarrow{a0a(n^{bs})},$$

The vector representative of the propagation channel between the emitter device TX and $M^T$ when the paths of said channel pass through the diffusers $n^s$ is noted $h\in \mathbb{C}^{1\times N^{bs}}$. The $n^{th}$ coefficient $h_{n^{bs}}$ of h is expressed as follows:

$$h_{n^{bs}} = \sum_{n^s=1}^{N^s} v(n^{bs}, n^s)$$

FIG. 6 represents, in flowchart form, a configuration method according to the invention, as implemented by the emitter and/or receiver devices of FIG. 3A.

During a first step E10, an estimation of the real propagation channel h is carried out, and a plurality $N^s$ of real paths $n^s$ of the real propagation channel h between the emitter device TX and the receiver device RX is determined. This step also makes it possible to estimate, for each of the paths, an amplitude gain, a phase shift and a direction. Said step E10 is implemented by the determination module MOD_PTH_TX fitted to the emitter device TX or by the determination module MOD_PTH_RX fitted to the receiver device RX.

FIG. 7 illustrates an example of estimation of a propagation channel in a wireless network according to a TDD (Time Division Duplex) mode, and FIG. 8 according to an FDD (Frequency Division Duplex) mode.

Once the real propagation channel h has been probed, a propagation channel called “virtual propagation channel” $h^{eq}$ is determined by the emitter device TX during a step referenced E20. This virtual propagation channel comprises a plurality of virtual paths, a virtual path corresponding to one of the real paths. Each virtual path has the same starting direction and the same phase shift as the real path to which it corresponds, and the virtual paths have an amplitude gain comprised in the same determined interval of positive real numbers. As indicated previously, equalizing the amplitude gain of each of the real paths of the real propagation channel makes it possible to obtain virtual paths which all have the same amplitude gain value. Said step E20 is implemented by the determination module MOD_CNL fitted to the emitter device TX.

In other words, let $\beta^{eq}(n^s)$ the equalized amplitude gain and $h^{eq}\in \mathbb{C}^{1\times N^{bs}}$ the propagation vector representative of the virtual propagation channel between the emitter device and $M^T$ when the associated propagation paths pass through diffusers. Then the $n^{bs\text{-}th}$ coefficient $$h^{eq}_{n^{bs}}$$

is expressed as follows:

$$h^{eq}_{n^{bs}} = \sum_{n^s=1}^{N^s} v^{eq}(n^{bs}, n^s)$$

with $v^{eq}(n^{bs}, n^s)$ the complex gain associated with the propagation path between a position $a(n^{bs})$ of the antenna element $n^{bs}$ and a position $M^T$ of the receiver device and passing through a diffuser $n^s$ at a position $\sigma(n^s)$ equalized to a value $v^{target}>0$ comprised in a determined interval of real and positive values $[v^{min}, v^{max}]$, $v^{eq}(n^{bs}, n^s)$ being of the form:

$$v^{eq}(n^{bs}, n^s) = v^{target} * v(n^{bs}, n^s)/\|v(n^{bs}, n^s)\|$$

Then during a step E30, a precoder $b^{MRT,eq}$ is determined as a function of the virtual propagation channel $h^{eq}$. This precoder then precodes a signal intended to be emitted in the form of beams all having the same electric field.

The precoder MRT $b^{MRT,eq}$ is then expressed as follows:

$$b^{MRT,eq} = \frac{h^{eq\dagger}}{\|h^{eq\dagger}\|},$$

with $h^{eq^\dagger}$ the Hermitian vector of $h^{eq^\dagger}$.

Generally, the determination of a precoder of an emitter device is a conventional operation known to those skilled in the art, and comprises the determination of coefficients of a precoding matrix making it possible to optimize the emission of the signal in the form of beams. This determination advantageously allows, as mentioned above, the emitter device TX to transmit beams in the directions of the previously determined propagation paths, these beams all reaching, in their direction, an electric field comprised in the same determined interval. In other words, each beam, in its particular direction, has the same electric field as the other beams.

Such an implementation is advantageous in comparison with the solutions of the prior art where the determination of a precoding matrix aimed at meeting a regulatory constraint leads to a reduction in the electric field of all the beams, and even of those that meet said regulatory constraint prior to the application of the determined matrix. According to the invention, the fact of transmitting as input of the precoder propagation paths having the same amplitude gain value allows the emitter device to emit beams in the directions of the previously determined propagation paths, these beams all having the same electric field.

Said step E30 is implemented by the determination module MOD_PCD fitted to the emitter device TX.

During a step E40, a transmitting power Pt is determined, so that the resulting electric field is smaller than said threshold value $E^{THRESH}$ beyond the predefined area around the emitter device TX. Said step E40 is implemented by the determination module MOD_PUI fitted to the emitter device TX.

More specifically, an emitter device TX equipped with an antenna having $N^{bs}$ antenna elements and emitting with a total power Pt a signal using a multi-carrier modulation (of the OFDM type) and precoded so as to form beams, is considered. The power Pt corresponds to the power when the wave is emitted with the $N^{bs}$ antenna elements.

The power P(Pos) received at a position Pos (which can correspond to a position on the circle C_P in FIG. 5B) can be calculated, for a given sub-carrier, and is of the form:

$$P(Pos) = \left|\sqrt{Pt} * h(Pos) * b\right|^2$$

with h(Pos) a vector representative of the propagation channel between the emitter TX and the position Pos and b a precoder. The vector h(Pos) is a row vector of complex coefficients and of dimension $N^{bs}$, and b a column vector of complex coefficients and of dimension $N^{bs}$.

Concerning this aspect, those skilled in the art can refer to the document "Massive MU-MIMO downlink TDD systems with linear precoding and downlink pilots," H. Q. Ngo, E. G. Larsson and T. L. Marzetta, 2013 51st Annual Allerton Conference on Communication, Control, and Computing (Allerton), 2013, pp. 293-298.

The module of the electric field E(Pos) at the position Pos is then expressed as follows:

$$E(Pos) = apha * \sqrt{P(Pos)} = \text{alpha} * \left|\sqrt{Pt} * h(Pos) * b\right|$$

with alpha a scalar constant depending on the wavelength and characteristics of the emission antenna. Concerning this alpha value, those skilled in the art can refer to the document "Electromagnetic Exposure and Quality of Service in the Downlink of Wireless Cellular Networks," M. K. Karray, 2010 6th International Conference on Wireless and Mobile Communications, 2010, pp. 42-48.

From the expression for E(Pos) above, it is possible to deduce an expression of Pt such that $\text{alpha} * |\sqrt{Pt} * h(Pos) * b| \leq E^{THRESH}$.

In one particular embodiment, the method further comprises a step E50 of transmitting a signal in the form of beams, by using the precoder determined in step E30 and the transmitting power determined during step E40. This step E50 comprises a sub-step E50A of emitting the signal by the emitter device TX and a sub-step E50B of receiving the signal by the receiver device RX.

FIG. 7 represents, in flowchart form, one particular embodiment of the monitoring method illustrated in FIG. 6, when the determination step E10 is implemented by the emitter device TX. In this particular embodiment, this step E10 is referenced E10_TX and comprises the sub-steps E100A, E110 and E120. Moreover, the steps common to the methods in FIGS. 6 and 7 bear the same references and are not described again, for the sake of simplicity.

During a first step E110B, sequences comprising pilot symbols (also called "pilot sequences") are emitted by the receiver device and received by the emitter device TX during a step E100A.

During a step E110, the emitter device TX compares the received sequences with reference sequences, and decomposes the uplink propagation channel (e.g., the channel located between the receiver device RX and the emitter device TX) into a plurality of paths called "uplink paths".

Then, by application of the principle of reciprocity of the uplink and downlink propagation channels, the emitter device estimates during a step E120 the real propagation channel h.

The emitter device TX then implements the previously described steps E20 to E40.

FIG. 8 represents, in flowchart form, one particular embodiment of the monitoring method illustrated in FIG. 6, when the determination step E10 is implemented by the receiver device RX. In this particular embodiment, this step E10 is referenced E10_RX and comprises the sub-steps E130AB, E140, E150 and E160B. Moreover, the steps common to the methods in FIGS. 6 and 8 bear the same references and are not described again, for the sake of simplicity.

During a first step E110B, sequences are precoded by using, for each sequence, a distinct precoder associated with a direction in which the signal can be emitted by the emitter device TX. These sequences are then transmitted and then received by the receiver device RX during a step referenced E130B.

Then during a step E140, the real propagation channel is estimated and decomposed into a plurality of real paths. More particularly, for each real path, the receiver device determines a phase shift.

Then, for each of the determined propagation paths, the phase shift and information on the identification of the precoder associated with said path are transmitted to the emitter device TX during a step E160B.

Once received by the emitter device TX during a step E160A, the information on the identification of the precoder allows the emitter device TX to determine the direction of the path associated with said precoder.

Then, during a step E20, the emitter device TX determines a virtual propagation channel comprising a plurality of virtual paths, a virtual path corresponding to one of the real paths, each virtual path having the same starting direction and the same phase shift as the real path to which it corresponds, and the virtual paths having an amplitude gain comprised in the same determined interval of real and positive numbers.

The emitter device TX then implements steps E30 to E40 previously described.

FIG. 9 schematically represents the effects of the application of the invention to a wireless communication system, further comprising a reconfigurable intelligent device (RIS). This reconfigurable intelligent device offers the advantage of generating an additional path between said emitter device TX and said receiver device TX and passing through said reconfigurable intelligent device RIS.

Although this figure only includes a single reconfigurable intelligent device, no limitation is attached to the number of reconfigurable intelligent devices that the system comprises. For the remainder of the description, a system composed of $K^{ris} \geq 1$ reconfigurable intelligent devices RIS is considered. Each device RIS is equipped with $N^{ris}$ antenna elements preferentially spaced half a wavelength 0.5 λ along an axis. The position of the antenna element $n^{ris}$ (with $1 \leq n^{ris} \leq N^{ris}$) of the device $k^{ris}$ (with $1 \leq k^{ris} \leq K^{ris}$) is noted $\mu(n^{ris}, k^{ris}) \in \mathbb{R}^{3\times1}$. The center of the device $k^{ris}$ is also noted $\mu0(k^{ris}) \in \mathbb{R}^{3\times1}$.

For each antenna element $n^{ris}$ of each device $k^{ris}$, the signal propagates from the antenna element $n^{bs}$ of the emitter device TX to the antenna element $n^{ris}$ of the device $k^{ris}$, and is then multiplied by a weight $$w_{n^{ris}}^{k^{rs}} \in \mathbb{C}$$

corresponding to a phase shift, with a constant reflection amplitude $r^{ris}$, with $0 \leq r^{ris} \leq 1$, which depends on the hardware components of the device, before propagating from the element $n^{ris}$ of the device to the position $M^T$.

The amplitude gain for the path starting from the position a0 to the position $M^T$ and passing through the center $\mu0(k^{ris})$ of the device $k^{ris}$ is noted $\epsilon(k^{ris})$. $\epsilon(k^{ris})$ is a Gaussian variable. It is also considered that the devices RIS are sufficiently far from the emitter device TX and the receiver device RX (for example around a hundred of wavelengths), so that the approximation according to which the emitted wave is a plane wave is preserved.

The complex gain $\zeta(n^{bs}, k^{ris}, n^{ris})$ between the position $a(n^{bs})$ of each element $n^{bs}$ and the position $M^T$, of the receiver device when the path passes through an antenna element $n^{ris}$ of a device $k^{ris}$ at a position $\mu(n^{ris}, k^{ris})$ is expressed as follows:

$$\zeta(n^{bs}, k^{ris}, n^{ris}) = r^{ris} \in (k^{ris}) e^{-J\frac{2\pi}{\lambda}\eta(n^{bs}, k^{ris}, n^{ris})} w_{n^{ris}}^{ris} e^{-J\frac{2\pi}{\lambda}\theta(n^{ris}, k^{ris})}$$

$$\text{with } \eta(n^{bs}, k^{ris}, n^{ris}) = \frac{\overrightarrow{a0\mu0(k^{ris})}}{\|\overrightarrow{a0\mu0(k^{ris})}\|}\left(\overrightarrow{a0a(n^{bs})} + \overrightarrow{\mu0(k^{ris})\mu(n^{ris}, k^{ris})}\right)$$

$$\text{and } \theta(n^{ris}, k^{ris}) = \frac{\overrightarrow{\mu0(k^{ris})M^T}}{\|\overrightarrow{\mu0(k^{ris})M^T}\|} \cdot (\overrightarrow{\mu0(k^{ris})\mu(n^{ris}, k^{ris})})$$

$h \in \mathbb{C}^{1\times N^{bs}}$ then corresponds to the vector representative of the propagation channel between the emitter device TX and $M^T$ when the paths of said channel pass through the diffusers DIF or the devices RIS. The $n^{th}$ coefficient $h_{n^{bs}}$ of h is then expressed as follows:

$$h_{n^{bs}} = \sum_{n^s=1}^{N^s} v(n^{bs}, n^s) + \sum_{k^{ris}=1}^{K^{ris}} \sum_{n^{ris}=1}^{N^{ris}} \zeta(n^{bs}, k^{ris}, n^{ris})$$

The weight associated with the signal reflected by the device $k^{ris}$ is noted $$w^{k^{ris}} \in \mathbb{C}^{N^{r^{rs}}\times 1},$$

and $$w_{n^{ris}}^{ris}$$

is the coefficient numbered device $n^{ris}$ of the vector.

According to this particular embodiment, the configuration method comprises the following steps:

- a first step of estimating, by the device RIS, the propagation channel between said device RIS and the receiver device RX. In a relatively conventional manner, this step is implemented by configuring the receiver device RX so that it sends pilot sequences which, once received, are analyzed by the device RIS in order to determine this channel.
- a second step of determining, by the device RIS, the weights $$w_{n^{ris}}^{ris}$$

so as to guarantee the reflection of the signals towards the receiver device RX. The weights $$w_{n^{ris}}^{ris}$$

are then expressed as follows:

$$w_{n^{ris}}^{k^{ris}} e^{-J\frac{2\pi}{\lambda}\theta(n^{ris}, k^{ris})} = 1 \Leftrightarrow w_{n^{ris}}^{ris} = e^{J\frac{2\pi}{\lambda}\theta(n^{ris}, k^{ris})}$$

The method then comprises the previously described step E10. Then during step E20, a virtual propagation channel is determined which also takes into account the paths passing through the devices RIS.

More formally, the vector $$h_{n^{bs}}^{eq}$$

representative of the virtual propagation channel is then expressed as follows:

$$h_{n^{bs}}^{eq} = \sum_{n^s=1}^{N^s} v^{eq}(n^{bs}, n^s) + \sum_{k^{ris}=1}^{K^{ris}} \sum_{n^{ris}=1}^{N^{ris}} \zeta^{eq}(n^{bs}, k^{ris}, n^{ris})$$

Once the virtual propagation channel has been determined, steps E30 and E40 previously described are then implemented.

The invention has been described so far in the case where the amplitude gain of a virtual path is comprised in a determined interval of gain values, but the invention nonetheless remains applicable in the particular case where the interval is a singleton. In this particular case, the amplitude gain of a virtual path can be equal to a target value comprised in the determined interval. Thus and according to one example, this target value corresponds to the middle of this interval.

The invention also remains applicable in the particular case where the electric field is a singleton. This is a fortiori the case when the gain of the virtual paths is equal to a target value. The electric field can then be equal to a value comprised in the determined interval of electric field values. Thus and according to one example, this value corresponds to the middle of this interval of electric field values.

The invention claimed is:

1. A method for configuring an emitter device equipped with a plurality of antenna elements, the method comprising:

determining, by the emitter device or a receiver device, a plurality of real paths of a real propagation channel between the emitter device and the receiver device, each of the real paths being associated with an amplitude gain, a phase shift and a direction starting from said emitter device;

determining, by the emitter device, a virtual propagation channel comprising a plurality of virtual paths, a virtual path corresponding to one of the real paths, each virtual path having the same starting direction and the same phase shift as the real path to which it corresponds, and the virtual paths having an amplitude gain comprised in a same determined real and positive interval;

determining, by the emitter device and as a function of said virtual propagation channel, a precoder configured to precode a signal intended to be emitted in the form of beams pointing in the directions of the virtual paths, so that said beams all reach, in their direction, an electric field comprised in a same determined interval; and, determining a transmitting power, so that the electric field of said beams is smaller than a threshold value beyond a defined area around the emitter device.

2. The method of claim 1, wherein the real propagation channel is in downlink, and wherein determining the real paths is implemented by the emitter device and comprises:

receiving a pilot sequence emitted by the receiver device and received from an uplink propagation channel; and decomposing, as a function of the received pilot sequence, said uplink propagation channel into a plurality of uplink paths, the real paths being determined by taking into account a principle of reciprocity of the uplink and downlink propagation channels.

3. The method of claim 1, wherein determining the real paths is implemented by the receiver device and comprises:

receiving, by the receiver device, a plurality of pilot sequences coming from the emitter device, each pilot sequence being precoded by using a precoder associated with a direction in which the signal is emitted by the emitter device;

decomposing, by the receiver device and as a function of the plurality of received pilot sequences, the real propagation channel into the plurality of real paths;

determining, by the receiver device and for each real path of the plurality, a phase shift; and of transmitting, by the receiver device and to the emitter device, the phase shift of each of the real paths.

4. The method of claim 1, wherein the emitter device and the receiver device form a system further comprising at least one reconfigurable intelligent device, said reconfigurable intelligent device making it possible to generate an additional path between said emitter device and said receiver device and passing through said reconfigurable intelligent device, the method further comprising determining said additional path, said virtual propagation channel comprising a virtual path corresponding to said additional path whose amplitude gain is comprised in said interval.

5. The method of claim 1, wherein the virtual propagation channel determined during the determination of the virtual propagation channel is represented by a row vector of complex coefficients each coefficient of which is associated with one of said antenna elements of the emitter device, said vector being of the form:

$$h^{eq}_{n^{bs}} = \sum_{n^s=1}^{N^s} v^{eq}(n^{bs}, n^s)$$

with $v^{eq}(n^{bs}, n^s)$ the complex gain associated with the propagation path between a position $a(n^{bs})$ of the antenna element $n^{bs}$ and a position $M^T$ of the receiver device and passing through a diffuser $n^s$ at a position $\sigma(n^s)$, equalized to a value $v^{target}$ comprised in a determined interval of real and positive values $[v^{min}, v^{max}]$, $v^{eq}(n^{bs}, n^s)$ being of the form:

$$v^{eq}(n^{bs}, n^s) = v^{target} * v(n^{bs}, n^s) / \| v(n^{bs}, n^s) \|$$

and with $v(n^{bs}, n^s)$ the complex gain associated with the propagation path between the position $a(n^{bs})$ of the antenna element and the position $M^T$ of the receiver device and passing through the diffuser $n^s$ at the position $\sigma(n^s)$, $v(n^{bs}, n^s)$ being of the form:

$$v(n^{bs}, n^s) = \beta(n^s) e^{-J\frac{2\pi}{\lambda}\delta(n^{bs}, n^s)}, \text{ with } \delta(n^{bs}, n^s) = \frac{\overrightarrow{a0\sigma(n^s)}}{\|\overrightarrow{a0\sigma(n^s)}\|} \cdot \overrightarrow{a0\sigma(n^{bs})},$$

$\|A\|$ the norm of the vector A, and $\beta(n^s)$ the amplitude gain of the path $n^s$ from a position $a\mathbf{0}$ corresponding to the center of the emitter device to the position $M^T$, and passing through the position $\sigma(n^s)$.

6. The method of claim 5, wherein the precoder determined during the determining of the precoder is of the maximum ratio transmission, MRT, type and is of the form:

$$b^{MRT,eq} = \frac{h^{eq\dagger}}{\|h^{eq\dagger}\|}$$

with $h^{eq\dagger}$ the Hermitian vector of the vector $h^{eq}$.

7. The method of claim 1, wherein all the steps of the configuration method are implemented by the emitter device.

8. The method of claim 1, wherein determining the plurality of real paths is implemented by the receiver device, and the other steps of the configuration method are implemented by the emitter device.

9. A non-transitory, computer readable recording medium having stored thereon a computer program comprising instructions which when executed by a processor of an emitter device configure the emitter device to implement a configuration method comprising:

determining a plurality of real paths of a real propagation channel between the emitter device and a receiver device, each of the real paths being associated with an amplitude gain, a phase shift and a direction starting from said emitter device;

determining a virtual propagation channel comprising a plurality of virtual paths, a virtual path corresponding to one of the real paths, each virtual path having the same starting direction and the same phase shift as the real path to which it corresponds, and the virtual paths having an amplitude gain comprised in a same determined real and positive interval;

determining, as a function of said virtual propagation channel, a precoder configured to precode a signal intended to be emitted in the form of beams pointing in the directions of the virtual paths, so that said beams all reach, in their direction, an electric field comprised in a same determined interval; and, determining a transmitting power, so that the electric field of said beams is smaller than a threshold value beyond a defined area around the emitter device.

10. An emitter device equipped with a plurality of antenna elements and comprising:

at least one processor; and at least one non-transitory computer readable medium comprising instructions stored thereon which when executed by the at least one processor configure the emitter device to:

determine a plurality of real paths of a real propagation channel between the emitter device and a receiver device, each of the real paths being associated with an amplitude gain, a phase shift and a direction starting from said emitter device;

determine a virtual propagation channel comprising a plurality of virtual paths, a virtual path corresponding to one of the real paths, each virtual path having the same starting direction and the same phase shift as the real path to which it corresponds, and the virtual paths having an amplitude gain comprised in a same determined real and positive interval;

determine, as a function of said virtual propagation channel, a precoder configured to precode a signal intended to be emitted in the form of beams pointing in the directions of the virtual paths, so that said beams all reach, in their direction, an electric field comprised in a same determined interval; and, determine a transmitting power, so that the electric field of said beams is smaller than a threshold value beyond a defined area around the emitter device.

11. A communication system including:

the emitter device of claim 10, and a receiver device configured to receive the signal emitted by the emitter device.

12. The communication system of claim 11, further comprising at least one reconfigurable intelligent device equipped with a plurality of antenna elements and making it possible to generate at least one additional path between said emitter device and said receiver device and passing through said reconfigurable intelligent device.

* * * * *